Patented Apr. 26, 1949

2,468,457

UNITED STATES PATENT OFFICE 2,468,457

WATER-INSOLUBLE AZO DYESTUFFS

Henry Philip Orem, North Plainfield, Frederic Henry Adams, Bound Brook, N. J., and John Paul Goulding, Shepherdstown, W. Va., assignors to American Cyanamid Company, New York, N. Y., a corporation of Maine No Drawing. Application September 16, 1947, Serial No. 774,413

7 Claims. (Cl. 260—152)

This invention relates to the preparation of novel azo coloring matters and to the products so produced. More particularly, the present invention relates to new azo coloring matters produced by utilizing of a novel group of coupling components. Specifically, the invention relates to the use of arylides derived from 2-hydroxy-3-naphthoic acids and 6-amino-1,3- or -1,4-benzodioxan as coupling components in the production of azo dyestuffs and pigments.

While the instant application is concerned only with methods of producing the new azo compounds and the compounds so produced, the new arylides and their production form the subject matter of our copending application Serial No. 774,412, filed of even date and issued as Patent No. 2,465,979 March 29, 1949.

Many arylides of 2-hydroxy-3-naphthoic acid have been known. Many have been suitable for coupling to diazo compounds in the production of coloring matters useful for various purposes. In general, however, coloring matters so produced, particularly from simple, generally-available amines, are not satisfactory for general use in surface coatings. For such use, high resistance to the solvent action of the vehicle, i. e., linseed oil, varnish, lacquer solvents and the like, is essential. Lack of such resistance causes undesirable "bleeding," i. e., color penetration, or staining or over-running of one color upon an adjacent color. A typical illustration is the pigment prepared by coupling paranitroaniline upon 2-hydroxy-3-naphthoic anilide. This product "bleeds" very badly in linseed oil.

There remains, then, in the art an unsatisfied demand for generally useful, insoluble azoic coloring matters which are not subject to excessive "bleed" in the presence of surface-coating vehicles.

It is a principal object of the present invention to develop such coloring matters having the desired resistance to the solvent action of oils, lacquer solvents, varnish and the like. It is also an object of the present invention to produce these coloring matters from readily-available aromatic amines capable of being diazotized or tetrazotized. It is further desirable that the new coloring matters of good general wash and light fastness and adapted for general use in dyeing and printing operations as well as possessing the necessary bleed resistance.

In general, the objects of the present invention have been accomplished by the production of a new series of azo compounds derived from 2-hydroxy-3-naphthoic acid benzo-1',3'- (or -1',4'-) dioxan-6'-amides. These dyestuffs may be considered as represented by the general type formula R(—N=N—Y)$_n$ wherein: R is the residue of a diazotized aromatic monoamine or a tetrazotized aromatic diamine, which amines are free from such solubilizing substituents as sulfonic or carboxylic acid groups; $n$ is an integer, either one or two; and Y is the residue of one of the new arylides represented by the formulae:

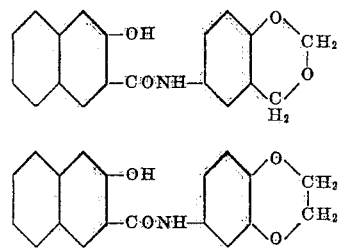

The new azo coloring matters of the present invention in addition to possessing good wash and light fastness, exhibit a remarkable degree of bleed resistance to the solvent action of various surface coating composition vehicles, particularly materials such as linseed oil and the like. In view of the behavior of similar insoluble colors derived from previously-known arylides of 2-hydroxy-3-naphthoic acid this property is quite unexpected. For example, the pigment prepared from diazotized paranitroaniline and the 2-hydroxy-3-naphthoyl derivative of 6-aminobenzo 1,3-dioxan shows excellent bleed resistance in sharp contrast to the corresponding pigment from the anilide of 2-hydroxy-3-naphthoic acid.

The reasons for such striking difference in behavior between the arylides of this invention and those previously known is not well understood. Accordingly, it is not intended to limit the present invention to any theory of mode of action.

It is an advantage of the new products of this invention that they may be quite widely varied and are easily prepared. In general, the products of the present invention may be prepared by coupling the novel arylides of 2-hydroxy-3-naphthoic acid and 6-amino-1,3- (or -1,4-) benzodioxan with substantially any diazotized aromatic mono-amine or tetrazotized aromatic diamine which is free from solubilizing substituents. Coupling may be accomplished by any of the standard known procedures. For example, it is readily conducted in the presence of an acid binder such as sodium acetate.

Wide color and shade ranges in the products of the present invention are available since they can be produced from any aromatic amine, such as a monoamine or a diamine, free from solubilizing substituents such as the sulfonic or carboxylic, and capable of being diazotized or tetrazotized and coupled to form azo dyestuffs. Thus, the following bases are some typical examples: Aniline, its homologs, and their halogen, nitro, alkoxy, aryloxy, acylamino, sulfon, sulfonamide, and cyano derivatives; xenylamine; the naphthylamines; amino-azo compounds; benzidine; dianisidine; derivatives of 4,4'-diaminostilbene, etc. Furthermore, diamines in which one only of the amino groups can be diazotized, such as 2,6-dichloro-1,4-phenylenediamine, can be employed. If the amino compound contains more than one substituent, these may be either the same or different, such as, for example, 2-methoxy-5-chloroaniline.

It is also an advantage of the present invention that the new colors are of general utility. They may be produced in substance or on a substrate and used as pigments; or they may be prepared on textile materials according to the procedures commonly used for the production of ice colors upon fiber. For example, cellulosic materials may be impregnated or padded with an alkaline solution of one of the N-substituted amides described above, and the cloth thus impregnated may be dyed by immersion in a properly buffered solution of a diazo compound, or this impregnated cloth may be printed with a printing paste containing a diazonium salt in solution.

Another method of utilization of the products of the present invention consists in mixing the arylide, together with a water-soluble diazo-amino or diazoimino compound, with sufficient alkali and thickener to form a printing paste. This is printed on the fiber, and then the printed fabric is exposed to hot vapors of organic acids, such as acetic or formic acid, whereby the color is developed in the printed pattern.

Still another method comprises mixing the arylide with a diazo-sulfonate and an oxidizing agent, dissolving the mixture in dilute alkali, thickening the solution with a suitable thickener, printing upon cellulosic materials, and developing the color upon the fiber by treatment with steam in the presence of weak acid vapors. The new arylides are readily prepared by simple methods requiring no extraordinary precautions as to the process or requirements as to apparatus. In general, the preparation consists in the condensation with 2-hydroxy-3-naphthoic acid of 6-amino-1,3- (or 1,4-) benzodioxan. If so desired a suitable derivative of the acid may be used. This condensation may be effected by any of the well known methods. For example, the reaction may be carried out in an aromatic hydrocarbon solvent in the presence of phosphorous trichloride. Another procedure is by the reaction with a 2-hydroxy-3-naphthoyl halide in pyridine.

The invention will be more fully illustrated in conjunction with the following examples which are meant to be illustrative only and not by way of limitation. All parts are by weight unless otherwise noted.

*Example 1*

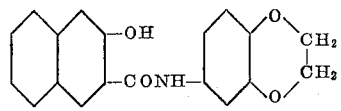

A mixture of 316 parts of monochlorobenzene and 37 parts of 2-hydroxy-3-naphthoic acid is heated to the boil, and boiling is continued until approximately 30 parts of monochlorobenzene have distilled over to dehydrate the mixture. The temperature is then lowered to 100° C., and 30 parts of 6-amino-1,3-benzodioxan are added. There is then added to this mixture over a period with constant stirring, 11 parts of phosphorous trichloride. A thick slurry results, which is heated with stirring at 100°–105° C. for about 1.5 hours, during which time hydrochloric acid gas is evolved. The temperature is then gradually raised to boiling and the mixture is gently boiled under reflux until essentially no more hydrochloric acid gas is evolved. After lowering the temperature to 250° C., the crude, insoluble product is filtered off. It is washed twice with 33 parts of monochlorobenzene, four times with 50 parts of hot 2% sodium bicarbonate solution, and finally with large quantities of hot water. The crude material is dried at low temperature. This material is partially purified by slurrying in hot sodium carbonate solution (2% strength), filtering and washing with water. Pure 6-(2'-hydroxy-3'-naphthoylamino)-1,3-benzodioxan is obtained by crystallization from glacial acetic acid, and melts at 254° C.

*Example 2*

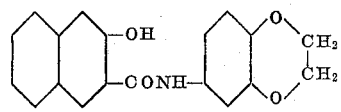

9.4 parts of 6-amino-1,4-benzodioxan and 15.5 parts of the acid chloride from 2-hydroxy-3-naphthoic acid are dissolved in 39 parts of pyridine. The mixture is refluxed for two hours, and the resulting solution, after cooling, is drowned in 150 parts of water, and filtered. The precipitate is washed with water, slurried in 2% bicarbonate solution, filtered again and washed again with water. It is dried at 100° C. 6-(2'-hydroxy-3'-naphthoylamino)-1,4-benzodioxan is further purified by dissolving in sodium hydroxide solution, clarifying with decoloring carbon, and precipitating with dilute hydrochloric acid, followed by washing with water and drying. Thus purified, the product melts at 207°–208° C. It is a colorless crystalline material similar in properties to the product obtained in the preceding example.

Typical illustrative procedures for the use of the arylides of the present invention in forming dyestuffs are set forth in the following examples. Again, all parts are by weight unless otherwise noted.

*Example 3*

An intimate mixture is made of 2.85 parts of the dipotassium salt of the stabilized diazo compound obtained by reacting the diazonium chloride from 2-amino-4-chloro anisole with guanylurea-N-sulfonic acid in alkaline medium according to U. S. Patent 2,154,470, and 2.02 parts of the coupling component prepared as described in Example 1.

Four parts of this mixture are intimately mixed with 5 parts of ethylene glycol mono-ethyl ether, 2.5 parts of 30° Bé. sodium hydroxide solution, and 18.5 parts of water. When solution is complete, 70 parts of a suitable starch thickener are added, and the whole is stirred until a smooth paste is obtained.

This paste is printed on cotton piece goods from an engraved copper roll, and the print thus made is dried at 60 C. It is then treated with steam in the presence of acetic acid vapors, rinsed, soaped at elevated temperature, rinsed again and dried. An intense bluish-red print of good fastness to washing and light is thus obtained.

The colors obtained by substituting stabilized diazo compounds prepared in a similar manner from aromatic amines other than 2-amino-4-chloro anisole are summarized below:

| Diazo Component | Color of Print |
| --- | --- |
| 5-Chlor-2-amino toluene | bluish red. |
| 4-Chlor-2-amino toluene | red. |
| Aniline | scarlet. |

*Example 4*

3.32 parts of the disodium salt of the stabilized diazo compound obtained by reacting the diazo compound from 2-amino-4-chloro toluene with guanylurea-N-sulfonic acid in alkaline medium according to U. S. Patent 2,154,470, and 2.1 parts of the coupling component obtained as described above in Example 2 are intimately mixed with 0.12 parts of neutralized and dried sulfonated castor oil. 4 parts of this mixture are made into a printing paste, printed and finished according to the method described in Example 3. A bluish red print of good strength, brightness and general fastness properties is obtained.

The colors obtained by substituting stabilized diazo compounds prepared in a similar manner from aromatic amines other than 2-amino-4-chloro toluene are summarized below:

| Diazo Component | Color of Print |
| --- | --- |
| 4-Chlor-2-amino anisole | blue-red. |
| 3-Chloraniline | scarlet. |

*Example 5*

1.5 parts of 4-nitro-2-amino toluene are stirred in 50 parts of water and 3.1 parts of hydrochloric acid (1.19) are added. Diazotization is completed at 0°–5° C. by addition of 0.8 parts of sodium nitrite dissolved in 11 parts of water. To the diazo solution is added 1.4 parts of sodium acetate trihydrate.

3.3 parts of 6- (2'- hydroxy - 3' - naphthoylamino) -1,4-benzodioxan are dissolved in 100 parts of water by the addition of 1.7 parts of sodium hydroxide at 80°–100° C. The temperature is lowered to 10° C. and the above prepared diazo solution is added over a 10-minute period. After stirring for one-half hour, and 3.4 parts of glacial acetic acid and filter off the deep red pigment. It is well washed with water on the filter and is dried at 50° C.

The bright red pigment has the following formula:

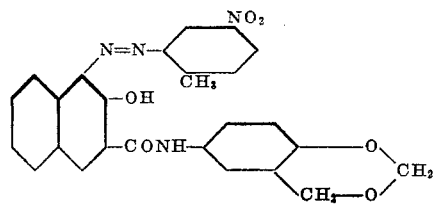

A sample of this pigment is thoroughly ground under linseed oil and the resulting paste is pressed on white, absorbent paper. There is no staining of the paper indicating that this pigment is essentially insoluble.

*Example 6*

1.7 parts of 4-nitro-2-amino anisole are stirred until well wetted in 50 parts of water. 3.1 parts of hydrochloric acid (1.19) are added and the temperature is lowered to 0°–5° C. Diazotization is completed by addition of 0.8 parts of sodium nitrite dissolved in 10 parts of water, and the resulting solution is treated with 1.3 parts of sodium acetate trihydrate.

This diazo solution is gradually added at low temperature to an alkaline solution containing 3.3 parts of 6-(2'-hydroxy-3'-naphthoylamino)-1,3-benzodioxan, 100 parts of water and 1.6 parts of sodium hydroxide. The precipitated pigment is filtered off, washed on the filter with water and dried at 50° C.

The bright bluish-red pigment has the following formula:

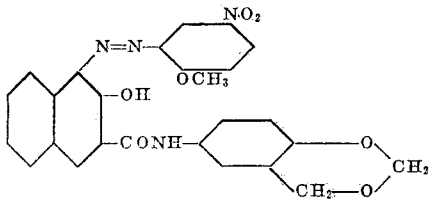

*Example 7*

When 1.4 parts of 4-nitraniline are substituted for the 4-nitro-2-amino anisole in the process of Example 6, a brilliant yellowish red pigment is obtained which has the following formula:

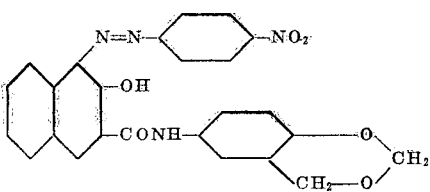

This pigment exhibits essentially no solubility or bleeding in linseed oil when examined as in Example 5.

*Example 8*

2 parts of 4-chloro-2-amino toluene hydrochloride are dissolved by heating in 4 parts of 17% hydrochloric acid and 50 parts of water. After lowering the temperature to 0°–3° C. the slurry is diazotized by gradual addition of 0.8 part of sodium nitrite in 10 parts of water. The resulting solution is clarified by filtration and the filtrate is diluted with water to a volume of 150 parts by volume. 15 parts by volume of this solution are diluted with 85 parts of cold water and 20% sodium acetate solution is run in until the solution is basic to Congo red test paper.

5 parts of a cotton skein are wet out at 75° C. in a 1% soap solution, rinsed and entered into a bath containing 1.0 part of 6-(2'-hydroxy-3'-naphthoylamino)-1,3-benzodioxan, 4.6 parts ethanol, 5.2 parts of 20% sodium hydroxide and 400 parts of water. The skein is turned in this bath for ¼ hour, removed and passed through squeeze rolls.

The skein thus impregnated is entered into the buffered diazo bath prepared as described above and is turned until full color is developed. It is then rinsed, treated in ½% soap solution at 65° C., rinsed and dried. The cotton skein is strongly dyed a brilliant red color.

Additional cotton skeins impregnated in a similar manner and dyed in similar buffered diazo baths prepared from other aromatic amines produced shades as described below:

| Diazo Component | Color of Dyeing |
|---|---|
| 3-Chloroaniline | deep orange. |
| 2-Methoxy-5-nitraniline | scarlet. |
| 2-Methoxy-4-nitraniline | bluish red. |

We claim:

1. New azo coloring matters represented by the formula:

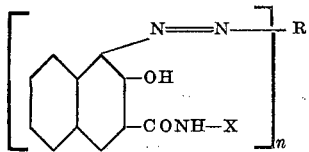

wherein R is the residue of an ice color diazo component, selected from the class consisting of the diazotizable aromatic amines of the benzene, biphenyl, and naphthalene series, X is a member selected from the group of benzo-1,3-dioxan and benzo-1,4-dioxan radicals linked through position 6 and $n$ is a positive integer selected from the numbers 1 and 2.

2. New azo coloring matters according to claim 1 in which $n$ equals 1.

3. New azo coloring matters according to claim 2 in which X represents benzo-1,3-dioxan linked in the 6 position.

4. New azo coloring matters according to claim 2 in which X represents benzo-1,4-dioxan linked in the 6 position.

5. The new azo compound represented by the formula:

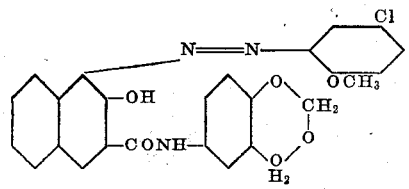

6. The new azo compound represented by the formula:

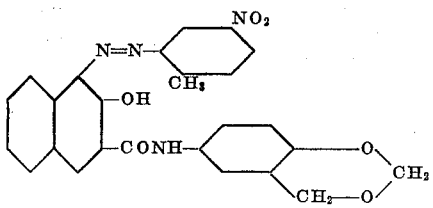

7. The new azo compound represented by the formula:

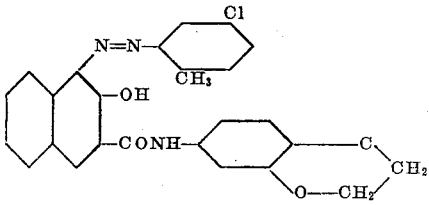

HENRY PHILIP OREM.
FREDERIC HENRY ADAMS.
JOHN PAUL GOULDING.

REFERENCES CITED

The following references are of record in the file of this patent:

UNITED STATES PATENTS

| Number | Name | Date |
|---|---|---|
| 2,379,684 | Conn et al. | July 3, 1945 |
| 2,379,725 | Lecher et al. | July 3, 1945 |
| 2,387,848 | Lecher et al. | Oct. 30, 1945 |
| 2,391,137 | Danuser et al. | Dec. 18, 1945 |
| 2,408,421 | Grimmel et al. | Oct. 1, 1946 |

Certificate of Correction

Patent No. 2,468,457.    April 26, 1949.

HENRY PHILIP OREM ET AL.

It is hereby certified that errors appear in the printed specification of the above numbered patent requiring correction as follows:

Column 4, line 52, for "decoloring" read *decolorizing*; column 5, line 62, for "and 3.4 parts" read *add 3.4 parts*; column 8, lines 9 and 10, claim 5, for that portion of the formula reading

    read    

and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*